(12) United States Patent
Shigeta

(10) Patent No.: US 12,700,752 B2
(45) Date of Patent: Aug. 4, 2026

(54) POWER CONVERSION DEVICE WITH A CONFIGURATION TO PREVENT A MALFUNCTION CAUSED BY A SOFT ERROR

(71) Applicant: TMEIC Corporation, Tokyo (JP)

(72) Inventor: Hiroki Shigeta, Chuo-ku (JP)

(73) Assignee: TMEIC CORPORATION, Tokyo (JP)

( * ) Notice: Subject to any disclaimer, the term of this patent is extended or adjusted under 35 U.S.C. 154(b) by 140 days.

(21) Appl. No.: 18/849,333

(22) PCT Filed: Feb. 28, 2023

(86) PCT No.: PCT/JP2023/007370
§ 371 (c)(1),
(2) Date: Sep. 20, 2024

(87) PCT Pub. No.: WO2024/180673
PCT Pub. Date: Sep. 6, 2024

(65) Prior Publication Data
US 2025/0202274 A1 Jun. 19, 2025

(51) Int. Cl.
*H02J 9/06* (2006.01)
*G06F 1/26* (2006.01)
(Continued)

(52) U.S. Cl.
CPC ................ *H02J 9/062* (2013.01); *G06F 1/26* (2013.01); *H02M 1/0067* (2021.05); *H02M 5/42* (2013.01)

(58) Field of Classification Search
None
See application file for complete search history.

(56) References Cited

U.S. PATENT DOCUMENTS 4,369,510 A 1/1983 Johnson et al.
11,386,008 B1 * 7/2022 Rom-Saksonov ...........................
G06F 12/0846
(Continued)

FOREIGN PATENT DOCUMENTS

JP 63-202148 A 8/1988
JP 4-101525 A 4/1992
(Continued)

OTHER PUBLICATIONS

Discriminating Between Soft Errors and Hard Errors in RAM (Year: 2008).*
(Continued)

*Primary Examiner* — Kim Huynh
(74) *Attorney, Agent, or Firm* — Knobbe, Martens, Olson & Bear, LLP

(57) ABSTRACT

A first controller includes a first processor and a first memory. A second controller includes a second processor and a second memory. In transmitting data from the first controller to the second controller, the first controller repeatedly performs a write operation of writing transmitted data into the first memory in accordance with a clock signal, and reads the transmitted data from the first memory and outputs the transmitted data. The second controller writes the received data into the second memory in accordance with the clock signal, and reads the received data from the second memory in accordance with the clock signal. When a plurality of data values of the received data read from the second memory match each other in a plurality of consecutive clock cycles including a current clock cycle, the second controller transmits the data value of the current clock cycle to the second processor.

10 Claims, 5 Drawing Sheets

(51) Int. Cl.
  *H02M 1/00*      (2007.01)
  *H02M 5/42*      (2006.01)

(56)           References Cited

U.S. PATENT DOCUMENTS

| | | | | |
|---|---|---|---|---|
| 2011/0249522 A1* | 10/2011 | Welker | ................ | G11C 29/023 |
| | | | | 365/194 |
| 2015/0061392 A1* | 3/2015 | Berard | ..................... | H02J 3/46 |
| | | | | 307/52 |
| 2015/0199233 A1* | 7/2015 | Pelley | ................ | G06F 11/1076 |
| | | | | 714/764 |
| 2020/0177021 A1* | 6/2020 | Abe | ........................ | H02J 9/062 |
| 2021/0065833 A1* | 3/2021 | Patrascu | ........... | G11C 29/1201 |
| 2023/0208185 A1 | 6/2023 | Imanishi et al. | | |

FOREIGN PATENT DOCUMENTS

| | | | |
|---|---|---|---|
| JP | 2021-19394 A | 2/2021 | |
| JP | 7200398 B1 | 1/2023 | |
| KR | 10-2023-0003139 A | 1/2023 | |

OTHER PUBLICATIONS

Soft Errors in Electronic Memory (Year: 2004).*
International Search Report issued on May 9, 2023 in PCT/JP2023/007370 filed on Feb. 28, 2023, 2 pages.
Office Action issued in Korean Application No. 10-2024-7031962, dated Dec. 16, 2025.
Office Action issued Dec. 3, 2024, in corresponding Japanese Patent Application No. 2024-517101 (with English Translation), 8 pages.

* cited by examiner

FIG.2

POWER CONVERSION DEVICE WITH A CONFIGURATION TO PREVENT A MALFUNCTION CAUSED BY A SOFT ERROR

TECHNICAL FIELD

The present disclosure relates to a power conversion device, and in particular to a power conversion device that includes a plurality of power conversion modules connected in parallel.

BACKGROUND ART

An uninterruptible power supply is widely used as a power conversion device to stably supply AC power to critical loads such as computer systems. As an example of the uninterruptible power supply, a modular uninterruptible power supply that includes a plurality of power conversion modules connected in parallel to a load may be given.

Each power conversion module of the modular uninterruptible power supply generally includes a converter that converts AC power into DC power, an inverter that converts DC power into AC power, and a controller that controls the converter and the inverter. The plurality of power conversion modules are communicably connected to each other by a communication line. The controller of each power conversion module exchanges various data with other power conversion modules via the communication line to realize parallel and synchronous operation of the plurality of power conversion modules.

The controller of each power conversion module includes a processor such as a CPU (Central Processing Unit) and a volatile memory such as a RAM (Random Access Memory). The volatile memory temporarily stores programs to be executed by the processor and data to be used by the processor. The volatile memory is also referred to as a main memory.

In each of the power conversion modules, as semiconductor devices become highly integrated and miniaturized, a transient bit error (a soft error) is likely to occur in the volatile memory. This soft error may be caused by, for example, the collision of cosmic ray neutrons. When a soft error occurs in the volatile memory in any one of the plurality of power conversion modules, the modular uninterruptible power supply may suffer from malfunction or temporary stop.

As a countermeasure against the soft error, for example, Japanese Patent Laying-Open No. 2021-19394 (PTL 1) proposes a technique to dispose a majority decision determiner in a controller of a power conversion device. The majority decision determiner is configured to input one piece of data into three logic circuits having the same configuration so as to generate three pieces of data, and when two or more pieces of data in the three pieces of data match each other, output the matched data. If the two or more pieces of data do not match other, the majority decision determiner determines that a soft error has occurred in the two or more pieces of data, and outputs a signal indicating the presence of a soft error.

CITATION LIST

Patent Literature

PTL 1: Japanese Patent Laying-Open No. 2021-19394

SUMMARY OF INVENTION

Technical Problem

In order to apply the majority decision determiner described in PTL 1 to each power conversion module of the modular uninterruptible power supply described above, it is required to form three logic circuits for generating multiplexed signals and three communication paths for transmitting the multiplexed signals on a control board mounted on each power conversion module. This makes the control board of each power conversion module complicated. As a result, the entire modular uninterruptible power supply may become complicated and expensive.

The present disclosure has been made in view of the above problem, and an object of the present disclosure is to provide a power conversion device in which a simple configuration is used to prevent a malfunction from being caused by a soft error.

Solution to Problem

A power conversion device according to an aspect of the present disclosure includes: a first module and a second module connected in parallel to a load; a first controller and a second controller provided corresponding to the first module and the second module, respectively; a communication line that communicatively connects the first controller and the second controller. The first controller includes a first processor and a first memory that temporarily stores a program to be executed by the first processor and data to be used by the first processor. The second controller includes a second processor and a second memory that temporarily stores a program to be executed by the second processor and data to be used by the second processor. In transmitting data from the first controller to the second controller, the first controller repeatedly performs a write operation of writing transmitted data into the first memory in accordance with a clock signal, reads the transmitted data from the first memory in accordance with the clock signal, and outputs the transmitted data to the communication line. The second controller writes received data received from the communication line into the second memory in accordance with the clock signal, and reads the received data from the second memory according to the clock signal. When all data values of the received data read from the second memory in a plurality of consecutive clock cycles including a current clock cycle match each other, the second controller transmits the received data of the current clock cycle to the second processor.

Advantageous Effects of Invention

According to the present disclosure, it is possible to use a simple configuration to prevent a malfunction from being caused by a soft error.

BRIEF DESCRIPTION OF DRAWINGS

FIG. 2 is a circuit block diagram illustrating an example configuration of a bypass module and an UPS module illustrated in FIG. 1;

DESCRIPTION OF EMBODIMENTS

Figure 1:
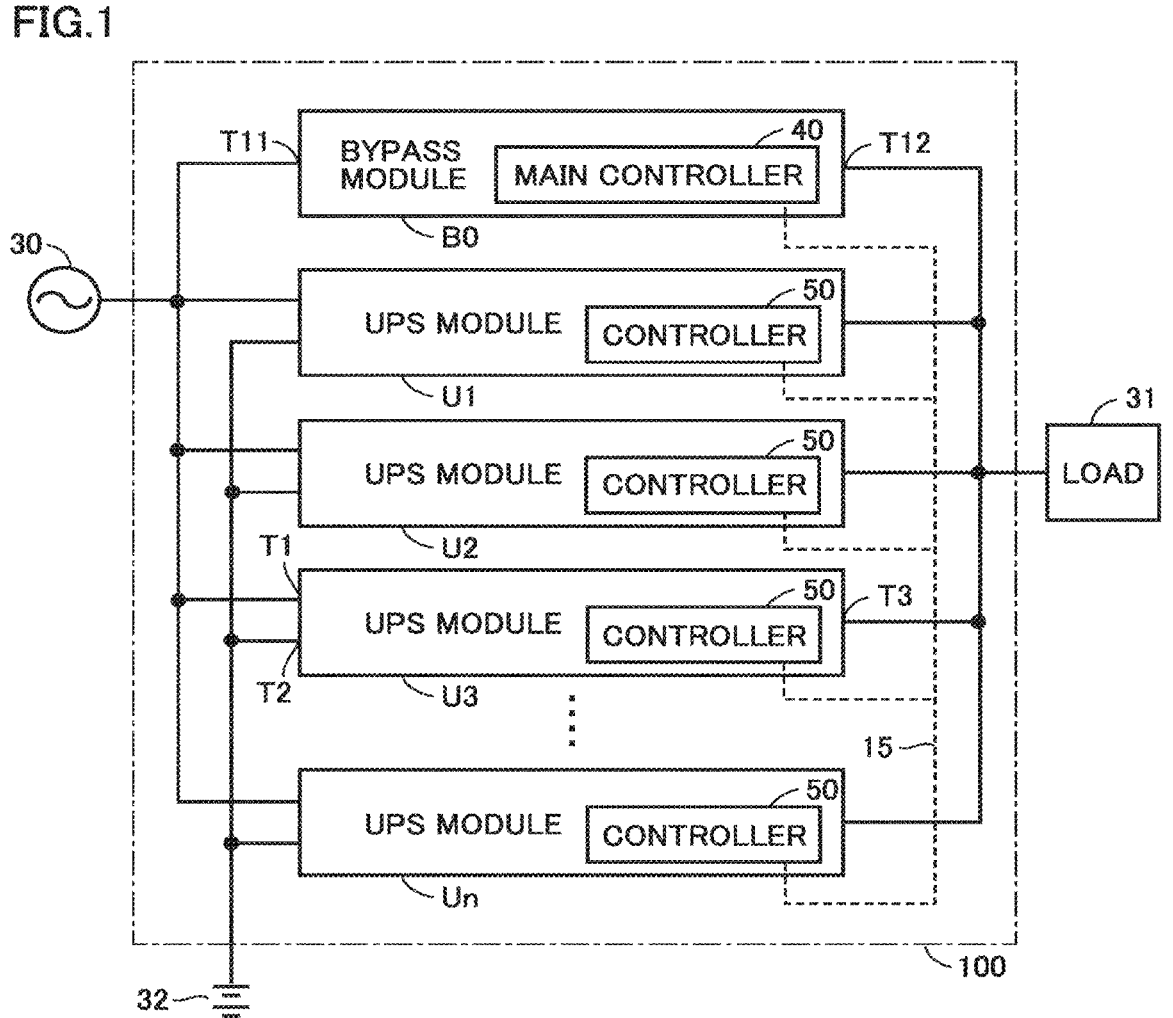
FIG. 1 is a circuit block diagram illustrating an example configuration of a power conversion device according to an embodiment of the present disclosure.

Hereinafter, embodiments of the present disclosure will be described in detail with reference to the drawings. In the following description, the same or corresponding parts in the drawings are denoted by the same reference numerals, and the description thereof will not be repeated.

<Configuration of Uninterruptible Power Supply>

FIG. 1 is a circuit block diagram illustrating an example configuration of a power conversion device according to an embodiment of the present disclosure. The power conversion device according to the present embodiment may be applied to, for example, an uninterruptible power supply 100 that supplies power to a load through a plurality of power conversion modules connected in parallel.

As illustrated in FIG. 1, the uninterruptible power supply 100 includes a bypass module B0, a plurality of UPS modules U1 to Un (n is an integer of 2 or more), and a communication line 15. The bypass module B0 and the UPS modules U1 to Un are communicably connected to each other by the communication line 15.

The bypass module B0 includes an input terminal T11, an output terminal T12, and a switch (not shown) connected between the input terminal T11 and the output terminal T12.

Each of the UPS modules U1 to Un is a power conversion module that includes a converter and an inverter. In the following description, the UPS modules U1 to Un may be collectively referred to as the "UPS module U". The UPS module U includes an input terminal T1, a battery terminal T2, and an output terminal T3.

The input terminal T11 of the bypass module B0 and the input terminal T1 of each UPS module U are connected to a commercial AC power supply 30. The input terminal T11 and each input terminal T1 receive a commercial-frequency AC voltage Vi from the commercial AC power supply 30.

The battery terminal T2 of each UPS module U is connected to a battery 32. The battery 32 stores DC power. The battery 32 serves as an example of a power storage device. A capacitor may be used to replace the battery 32.

The output terminal T12 of the bypass module B0 and the output terminal T3 of each UPS module U are connected to a load 31. In other words, the bypass module B0 and the UPS modules U1 to Un are connected in parallel to each other between the commercial AC power supply 30 and the load 31. The load 31 is driven by AC power supplied from the bypass module B0 or a plurality of UPS modules U1 to Un.

This uninterruptible power supply is referred to as a "modular uninterruptible power supply". The modular uninterruptible power supply is built with an internal parallel circuit composed of UPS modules with a number according to the capacity of the uninterruptible power supply. When N UPS modules are required by the uninterruptible power supply to supply power, (N+1) UPS modules may be mounted to improve power supply quality by redundancy. This method of achieving module-by-module redundancy in a single uninterruptible power supply is also referred to as "hot swap". The hot swap refers to a structure in which a UPS module may be stopped and swapped during the operation of the uninterruptible power supply. Thus, it is possible to replace a UPS module while the uninterruptible power supply continues to supply power in the event of a failure or an inspection of the UPS module.

The uninterruptible power supply 100 may operate in an inverter power supply mode or a bypass power supply mode. In the inverter power supply mode, AC power is supplied from the UPS module U to the load 31. In the inverter power supply mode, AC power from the commercial AC power supply 30 is converted into DC power by the converter of the UPS module U, and the DC power is converted into AC power by the inverter and the AC power is supplied to the load 31. In the bypass power supply mode, AC power is supplied from the commercial AC power supply 30 to the load 31 via the bypass module B0. In the bypass power supply mode, AC power from the commercial AC power supply 30 is supplied to the load 31, bypassing the UPS module U.

Figure 2:
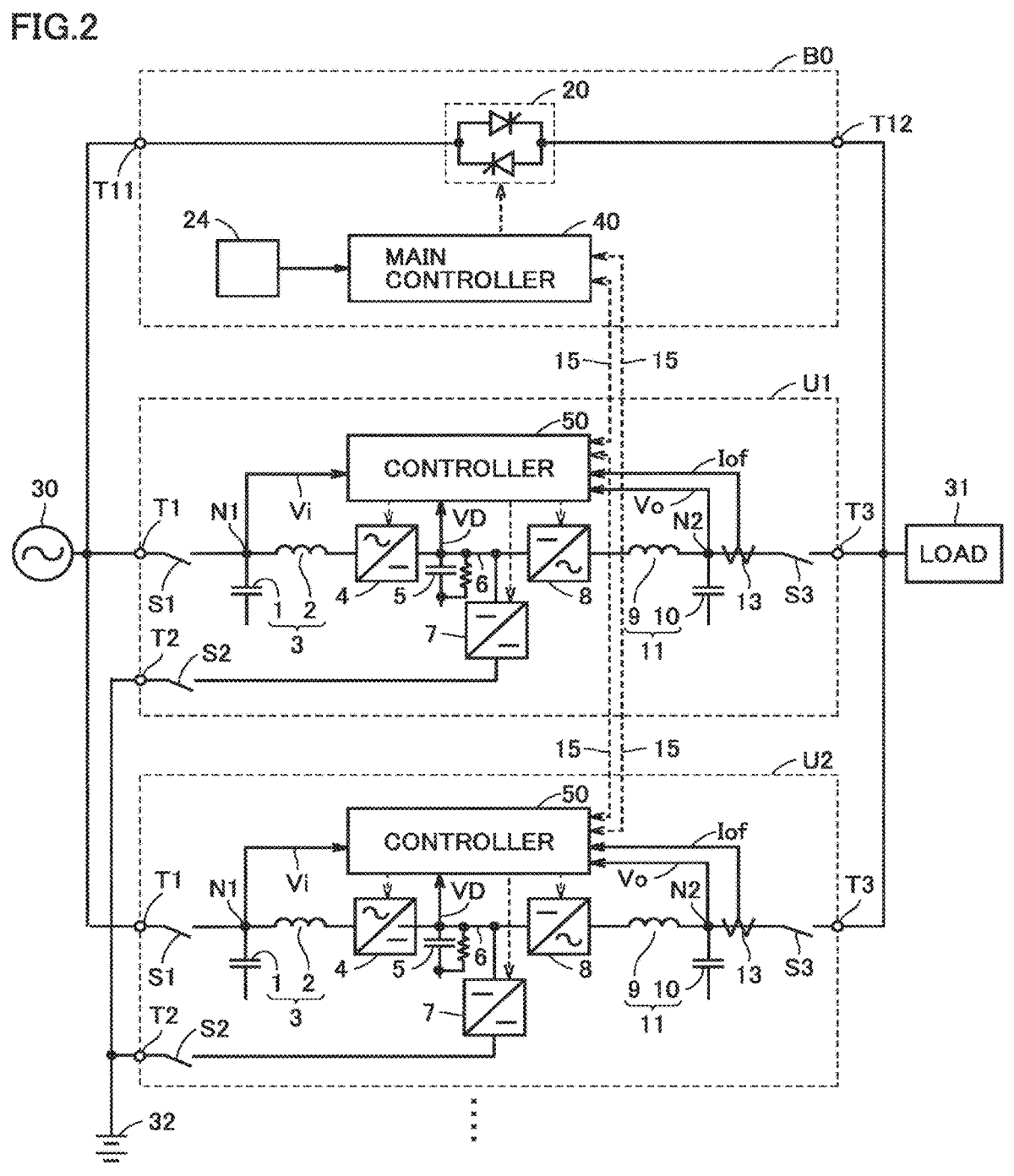

FIG. 2 is a circuit block diagram illustrating an example configuration of the bypass module B0 and the UPS module U illustrated in FIG. 1. The uninterruptible power supply 100 converts three-phase AC power from the commercial AC power supply 30 into DC power, converts the DC power into three-phase AC power, and supplies the three-phase AC power to the load 31. For simplicity of the drawing and the description, FIG. 2 only illustrates a partial circuit corresponding to one of the three phases (U phase, V phase, and W phase).

(Bypass Module B0)

As illustrated in FIG. 2, the bypass module B0 includes a semiconductor switch 20, a main controller 40, and an operation unit 24. The semiconductor switch 20 is connected between the input terminal T11 and the output terminal T12. The semiconductor switch 20 is, for example, a thyristor switch having a pair of thyristors connected in antiparallel. The semiconductor switch 20 is controlled by the main controller 40. The semiconductor switch 20 is turned off in the inverter power supply mode, and is turned on in the bypass power supply mode.

The operation unit 24 includes a plurality of buttons operated by a user of the uninterruptible power supply 100, a display for displaying various kinds of information, and the like. The user can operate the operation unit 24 to turn on or turn off the uninterruptible power supply 100, select one of the bypass power supply mode and the inverter power supply mode, or the like.

The operation unit 24 is connected to a communication network (not shown) and can exchange data with an external device of the uninterruptible power supply 100 via the communication network. The external device includes, for example, a PC or a server. The operation unit 24 may further include a USB connector. In this case, the operation unit 24 exchanges data with the external device via the USB connector.

(UPS Module U)

The UPS module U includes switches S1 to S3, capacitors 1, 5 and 10, reactors 2 and 9, a converter 4, a DC line 6, a bidirectional chopper 7, an inverter 8, a current detector 13, and a controller 50.

The switch S1 and the reactor 2 are connected in series between the input terminal T1 and an input node of the converter 4. The capacitor 1 is connected to a node N1 between the switch S1 and the reactor 2. The switch S1 is turned on when a corresponding UPS module U is switched to the operation state, and turned off when the corresponding UPS module U is switched to the stop state. The instantaneous value of the AC input voltage Vi appearing at the node N1 is detected by the controller 50. Based on the instantaneous value of the AC input voltage Vi, whether or not the commercial AC power supply 30 is in a power failure is determined.

The capacitor 1 and the reactor 2 constitute an AC filter 3. The AC filter 3 is a low-pass filter which allows AC power of a commercial frequency to pass from the commercial AC power supply 30 to the converter 4 and prevents a signal of a switching frequency generated by the converter 4 from passing through the commercial AC power supply 30.

The converter 4 is controlled by the controller 50, and during normal operation in which AC power is supplied from the commercial AC power supply 30, converts the AC power into DC power and outputs the DC power to the DC line 6. When the commercial AC power supply 30 is in a power failure, the operation of the converter 4 is stopped.

The capacitor 5 is connected to the DC line 6, and is configured to smooth the voltage of the DC line 6. The instantaneous value of a DC voltage VD appearing on the DC line 6 is detected by the controller 50. The DC line 6 is connected to a high voltage node of the bidirectional chopper 7, and a low voltage node of the bidirectional chopper 7 is connected to the battery terminal T12 via the switch S2.

The switch S2 is turned on when the corresponding UPS module U is in use, and turned off during the maintenance of the corresponding UPS module U and the battery 32. The instantaneous value of an inter-terminal voltage VB of the battery 32 appearing at the battery terminal T2 is detected by the controller 50.

The bidirectional chopper 7 is controlled by the controller 50, and is configured to store the DC power generated by the converter 4 in the battery 32 during normal operation and to supply the DC power of the battery 32 to the inverter 8 via the DC line 6 when the commercial AC power source 30 is in a power failure.

The bidirectional chopper 7 steps down the DC voltage VD of the DC line 6 and provides the stepped voltage to the battery 32 so as to store DC power in the battery 32. The bidirectional chopper 7 boosts the inter-terminal voltage VB of the battery 32 and outputs the boosted voltage to the DC line 6 so as to supply the DC power of the battery 32 to the inverter 8. The DC line 6 is connected to an input node of the inverter 8.

An output node of the inverter 8 is connected to a first terminal of a reactor 9, and a second terminal (a node N2) of the reactor 9 is connected to the output terminal T3 via the switch S3. A capacitor 10 is connected to the node N2. The instantaneous value of an AC output voltage Vo appearing at the node N2 is detected by the controller 50. The current detector 13 detects an instantaneous value of a current Io flowing from the node N2 to the output terminal T13 (i.e., the load 31) via the switch S3, and provides a signal Iof indicating the detected value to the controller 50.

The reactor 9 and the capacitor 10 constitute an AC filter 11. The AC filter 11 is a low-pass filter which allows AC power of a commercial frequency generated by the inverter 8 to pass through the output terminal T3 and prevents a signal of a switching frequency generated by the inverter 8 from passing through the output terminal T3. The switch S3 is controlled by the controller 50, and is turned on when the corresponding UPS module U is in operation and turned off when the corresponding UPS module U is not in operation.

The controller 50 controls a corresponding UPS module U based on the AC input voltage Vi, the DC voltage VD, the inter-terminal voltage VB of the battery 32, the AC output current Io, the AC output voltage Vo, and the like. In other words, the controller 50 detects whether or not there is a power failure based on the detected value of the AC input voltage Vi, and controls the converter 4 and the inverter 8 in synchronization with the phase of the AC input voltage Vi.

Further, the controller 50 controls the converter 4 so as to bring the DC voltage VD to a desired target voltage VDT during the normal operation, and stops the operation of the converter 4 during a power failure of the commercial AC power supply 30. Further, the controller 50 controls the bidirectional chopper 7 so as to bring the inter-terminal voltage VB of the battery 32 to a desired target battery voltage VBT during the normal operation, and controls the bidirectional chopper 7 so as to bring the DC voltage VD to a desired target voltage VDT during a power failure of the commercial AC power supply 30.

The controller 50 is connected to the main controller 40 and the other controllers 50 of the UPS modules U via the communication line 15, and exchange various data with the main controller 40 and the other controllers 50 via the communication line 15. The communication system between the main controller 40 and each controller 50 is serial communication. The controller 50 controls the converter 4 and the inverter 8 so that the current is evenly shared among the plurality of UPS modules U based on the data from the main controller 40 and the other controllers 50.

The main controller 40 controls the entire uninterruptible power supply 100 based on signals or the like from the plurality of UPS modules U. Each controller 50 controls a corresponding UPS module U in accordance with a control command supplied from the main controller 40.

Specifically, the main controller 40 determines the sum of the output currents Io of the plurality of UPS modules U, in other words, a load current IL based on the output signals Iof of the plurality of current detectors 13 transmitted from the respective controllers 50, and determines the number of UPS modules U required to be operated to supply the load current IL. Further, the main controller 40 compares the determined number of UPS modules required to be operated with the number of currently operating UPS modules, and determines whether to operate or stop each UPS module U based on the comparison result. The main controller 40 transmits a signal indicating the determination result to each controller 50 via the communication line 15.

In order to stop a corresponding UPS module U, the controller 50 turns off the corresponding switches S1 and S3, and stops the operation of the corresponding converter 4, bidirectional chopper 7, and inverter 8. In order to operate a corresponding UPS module U, the controller 50 maintains the corresponding switches S1 and S3 at the ON state, and continues the operation of the corresponding converter 4, bidirectional chopper 7, and inverter 8.

(Example Hardware Configuration of Main Controller 40 and Controller 50)

Figure 3:
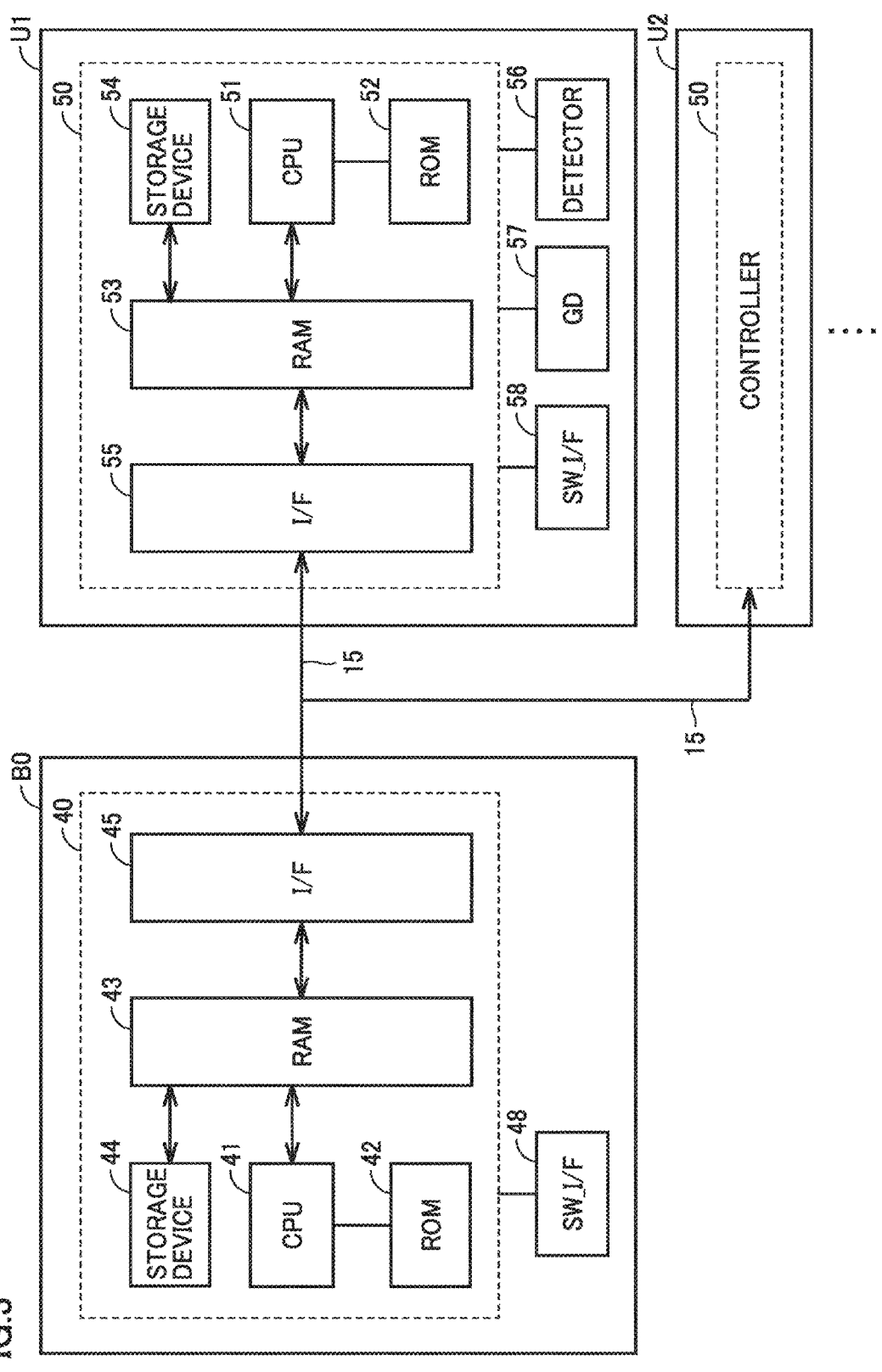
FIG. 3 is a block diagram illustrating an example hardware configuration of a main controller and a controller.

FIG. 3 is a block diagram illustrating an example hardware configuration of the main controller 40 and the controller 50.

As illustrated in FIG. 3, the main controller 40 includes a CPU (Central Processing Unit) 41, a ROM (Read Only Memory) 42, a RAM (Random Access Memory) 43, a storage device 44, and an I/F (Interface) device 45. The CPU 41, the ROM 42, the RAM 43, the storage device 44, and the I/F device 45 exchange various data through a communication bus.

The CPU 41 loads a program stored in the ROM 42 into the RAM 43 and executes the program. The program stored in the ROM 42 defines a process to be executed by the main controller 40 of the bypass module B0. The RAM 43 temporarily stores a program to be executed by the CPU 41 and data to be used by the CPU 41. The RAM 43 is a volatile memory and functions as a main memory of the main controller 40.

The I/F device 45 is an input/output device that exchanges signals or data with the controller 50 of each UPS module U. The I/F device 45 is connected to the communication line 15, and is configured to receive various signals from the controller 50 of each UPS module U via the communication line 15. Further, the I/F device 45 transmits various signals such as a control command generated by the CPU 41 to the controller 50 of each UPS module U via the communication line 15.

The storage device 44 stores various kinds of information such as information about the uninterruptible power supply 100, information about each UPS module U, various kinds of information received from the operation unit 24, and the like. The information about each UPS module U includes the output signal Iof from the current detector 13 in each UPS module U, failure information indicating the presence or absence of a failure in each UPS module U, and the like. The various kinds of information received from the operation unit 24 include mode setting information indicating whether to set the uninterruptible power supply 100 to the bypass power supply mode or the inverter power supply mode, setting information about the priority order to stop the plurality of UPS modules U1 to Un, and the like. The storage device 44 is, for example, a rewritable semiconductor memory such as a flash memory or a hard disk drive (HDD).

The main controller 40 is connected to a switch I/F 48. The switch I/F 48 turns on or turns off the semiconductor switch 20 in accordance with an ON command or an OFF command supplied from the main controller 40.

The controller 50 includes a CPU 51, a ROM 52, a RAM 53, a storage device 54, and an I/F device 55. The CPU 51, the ROM 52, the RAM 53, the storage device 54, and the I/F device 55 exchange various data through a communication bus.

The CPU 51 loads a program stored in the ROM 52 into the RAM 53 and executes the program. The program stored in the ROM 52 defines a process to be executed by the controller 50 of the UPS module U. The RAM 53 temporarily stores a program to be executed by the CPU 51 and data to be used by the CPU 51. The RAM 53 is a volatile memory and functions as a main memory of the controller 50.

The I/F device 55 is an input/output device that exchanges signals or data with the main controller 40 of the bypass module B0 and the controllers 50 of the other UPS modules U. The I/F device 55 is connected to the communication line 15, and is configured to receive various signals such as a control command from the main controller 40 via the communication line 15. Further, the I/F device 55 receives various signals from the controller 50 of another UPS module U. The I/F device 55 transmits the output signal Iof of the current detector 13 and the failure information to the main controller 40 via the communication line 15.

The storage device 54 stores various kinds of information such as information about the UPS module U, various kinds of information received from the main controller 40, and the like. The information about the UPS module U includes the output signal Iof from the current detector 13 in the UPS module U, failure information indicating the presence or absence of a failure in each UPS module U, and the like. The various kinds of information received from the main controller 40 include mode setting information, control commands, and the like. The storage device 54 is, for example, a rewritable semiconductor memory such as a flash memory or an HDD.

The controller 50 is connected to a detector 56, a gate driver (GD) 57, and a switch I/F 58. The detector 56 includes a detector for detecting an instantaneous value of the AC input voltage Vi, an instantaneous value of the DC voltage VD, an instantaneous value of the inter-terminal voltage VB of the battery 32, and an instantaneous value of the AC output voltage Vo. The detector 56 further includes a current detector 13.

The gate driver 57 includes a gate driver that drives a plurality of switching elements included in the converter 4, a gate driver that drives a plurality of switching elements included in the bidirectional chopper 7, and a gate driver that drives a plurality of switching elements included in the inverter 8. Each gate driver drives a corresponding plurality of switching elements in accordance with a gate signal supplied from the controller 50.

The switch I/F 58 turns on or turns off the switches S1 to S3 in accordance with an on command or an off command supplied from the controller 50.

The main controller 40 and the plurality of controllers 50 exchange data with each other via the communication line 15 to control the operations of the bypass module B0 and the UPS modules U. The communication line 15 is configured to transmit data through serial communication in two directions. Thus, even if the number of UPS modules U (i.e., the number of the controllers 50) increases, it is not necessary to increase the number of the communication lines 15.

On the other hand, in each module, as semiconductor devices become highly integrated and miniaturized, a transient bit error (a soft error) is likely to occur in the volatile memory. This soft error may be caused by, for example, the collision of cosmic ray neutrons. When a soft error occurs in the RAM of either the bypass module B0 or the UPS module U, the uninterruptible power supply 100 may suffer from malfunction or temporary stop.

As a countermeasure against the soft error, PTL 1 proposes a technique to dispose a majority decision determiner in a controller of a power conversion device. The majority decision determiner is configured to input one piece of data into three logic circuits having the same configuration to generate three pieces of data, and when two or more pieces of data in the three pieces of data match each other, output the matched data. If the two or more pieces of data do not match other, the majority decision determiner determines that a soft error is present in the two or more pieces of data, and outputs a signal indicating that the presence of a soft error.

However, in order to apply the majority decision determiner to each module of the uninterruptible power supply 100, it is required to form three logic circuits for generating multiplexed signals and three communication paths for transmitting the multiplexed signals on a control board mounted on each module. Thus, the control board of each module becomes complicated, and as a result, the entire uninterruptible power supply 100 may become complicated and expensive.

Therefore, the present embodiment provides a novel configuration capable of preventing a malfunction of the uninterruptible power supply 100 from being caused by a soft error by using a simple configuration without using a majority decision determiner of the related art.

Figure 4:
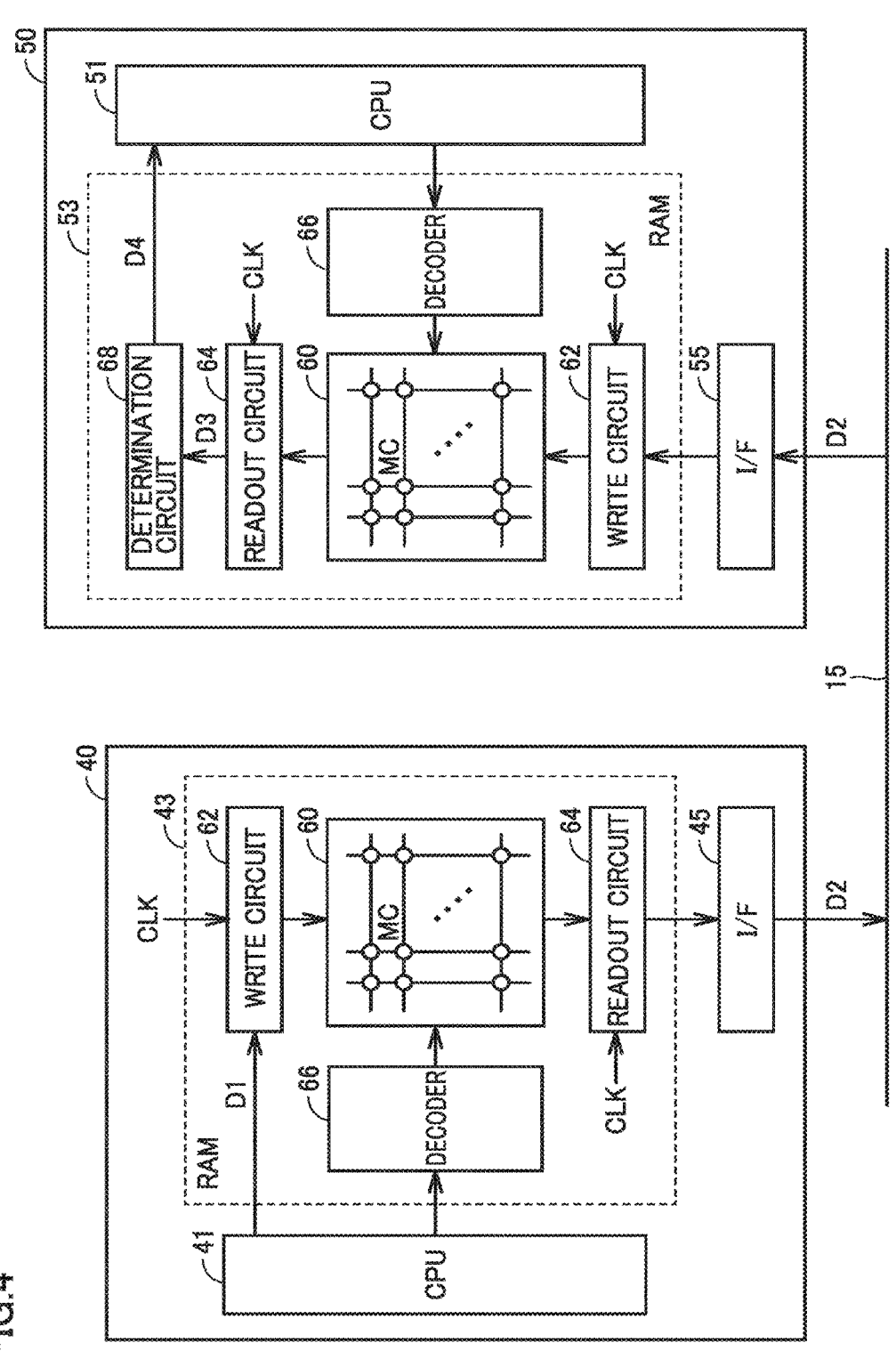
FIG. 4 is a diagram illustrating a procedure of transmitting data from a main controller to a controller.

FIG. 4 is a diagram illustrating a procedure of transmitting data from the main controller 40 to the controller 50. Note that the procedure described below can also be applied to data transmission between a plurality of controllers 50.

As illustrated in FIG. 4, the RAM 43 in the main controller 40 receives data for transmission D1 from the CPU 41 or the storage device 44. The data for transmission D1 refers to data to be transmitted to each controller 50, and may be, for example, a control command generated by the CPU 41, mode setting information from the storage device 44, or the like. The RAM 43 generates transmitted data D2 to be transmitted to the controller 50 from the received data for transmission D1. The RAM 43 outputs the transmitted data D2 to the communication line 15.

The RAM 43 includes a memory cell array 60, a write circuit 62, a readout circuit 64, and a decoder 66. In the memory cell array 60, a plurality of memory cells MC are arranged in the form of a matrix. One memory cell MC is configured to store one bit of data. However, the collision of cosmic ray neutrons may cause a soft error to occur, which disturbs data stored in a memory cell MC.

The decoder 66 selects a memory cell MC from the memory cell array 60 in accordance with an address signal from the CPU 41. The write circuit 62 writes data into the memory cell MC selected by the decoder 66 during a write operation. The readout circuit 64 reads data from the memory cell MC selected by the decoder 66 during a read operation.

Hereinafter, a flow of generating the transmitted data D2 from the data for transmission D1 will be described.

The write circuit 62 writes the data for transmission D1 into the selected memory cell MC. During this process, the write circuit 62 repeatedly writes the data for transmission D1 into the memory cell MC in accordance with a clock signal CLK supplied from a clock generation circuit (not shown). Thus, the data stored in the memory cell MC is updated in every clock cycle of the clock signal CLK. Therefore, even if a soft error occurs in a certain memory cell MC, correct data will be written into the memory cell MC in the next clock cycle, and thus the memory cell MC can be returned to its original normal state.

The readout circuit 64 reads the data for transmission D1 from the selected memory cell MC in accordance with the clock signal CLK, and outputs the data for transmission D1 read from the selected memory cell MC to the I/F device 45. The I/F device 45 outputs the data for transmission D1 from the RAM 43 to the communication line 15 as transmitted data D2. The transmitted data D2 is transmitted to the controller 50 via the communication line 15.

After the I/F device 55 in the controller 50 receives the data D2 from the main controller 40 via the communication line 15, it stores the received data D2 in the RAM 53. The data D2 stored in the RAM 53 is transmitted to the CPU 51, which is used by the CPU 51 in arithmetic computation.

The RAM 53 includes a memory cell array 60, a write circuit 62, a readout circuit 64, a decoder 66, and a determination circuit 68. The RAM 53 differs from the RAM 43 in that the former further includes a determination circuit 68. The determination circuit 68 is disposed between the readout circuit 64 and the CPU 51. The determination circuit 68 is such a circuit that generates data D4 to be transmitted to the CPU 51 from data D3 received from another controller (the main controller 40 or the controller 50).

Hereinafter, a flow of generating the data D4 from the received data D2 will be described.

Upon receiving the received data D2 from the I/F device 55, the write circuit 62 writes the received data D2 into the memory cell MC selected by the decoder 66 in accordance with a clock signal CLK supplied from a clock generation circuit (not shown). In other words, the write operation of writing the received data D2 is performed every clock cycle so as to update the data stored in the memory cell MC. Therefore, even if a soft error occurs in a certain memory cell MC, correct data will be written into the memory cell MC in the next clock cycle, and thus the memory cell MC can be returned to the original normal state.

The readout circuit 64 reads the received data from the selected memory cell MC in accordance with the clock signal CLK, and outputs the received data D3 read from the selected memory cell MC to the determination circuit 68.

The determination circuit 68 receives the received data D3 from the readout circuit 64 every clock cycle. The determination circuit 68 compares the values of the data D3 in a plurality of consecutive clock cycles including the current clock cycle. In the following description, it is assumed that the determination circuit 68 compares the values of the data D3 in three consecutive clock cycles. Note that the number of values of the data D3 to be compared is not limited to three, and may be two or four or more.

The determination circuit 68 compares the value of the data D3 in the current clock cycle, the value of the data D3 in the previous clock cycle, and the value of the data D3 in a clock cycle before the previous clock cycle. When all of the three data values match each other, the determination circuit 68 determines that the value of the data D3 in the current clock cycle is correct. In this case, the determination circuit 68 transmits the data D3 in the current clock cycle to the CPU 51 as the data D4 from the main controller 40.

On the other hand, when at least one of the three data values is different, the determination circuit 68 determines that a data error may occur in any of the three data values due to a soft error. In this case, the determination circuit 68 does not transmit the data D3 of the current clock cycle to the CPU 51. The determination circuit 68 transmits the data D4 having the same value as the data D4 transmitted in the previous clock cycle to the CPU 51.

For example, when a temporary data error occurs in the current clock cycle due to a soft error, the value of the data D3 in the current clock cycle is different from the value of the data D3 in the previous clock cycle and the value of the data D3 in a clock cycle before the previous clock cycle. In this case, since the data D3 of the current clock cycle is not transmitted to the CPU 51, it is possible to prevent the CPU 51 from using wrong data to perform the arithmetic computation.

On the other hand, even if a soft error does not occur, the value of the transmitted data D2 from the main controller 40 may be changed, which may cause the value of the data D3 of the current clock cycle to become different from the value of the data D3 of the previous clock cycle and the value of the data D3 in a clock cycle before the previous clock cycle.

In such a case, the determination circuit 68 continuously compares the data D3 after the next clock cycle while maintaining the value of the data D4 to be transmitted to the CPU 51. When the values of the three data D3, i.e., the value of the data D3 of the current clock cycle, the value of the data D3 of the next clock cycle, and the value of the data D3 of a clock cycle after the next clock cycle all match each other, the determination circuit 68 determines that the value of the transmitted data D2 itself has been changed. When all the values of the three data D3 match each other, the determination circuit 68 transmits the value of the data D3 to the CPU 51.

On the other hand, when the value of the data D3 after the next clock cycle is different from the value of the data D3 of the current clock cycle, the determination circuit 68 determines that a temporary data error has occurred in the current clock cycle. In this case, the determination circuit 68 transmits the value of the data D3 to the CPU 51 when all the values of the three data D3 match each other again.

Figure 5:
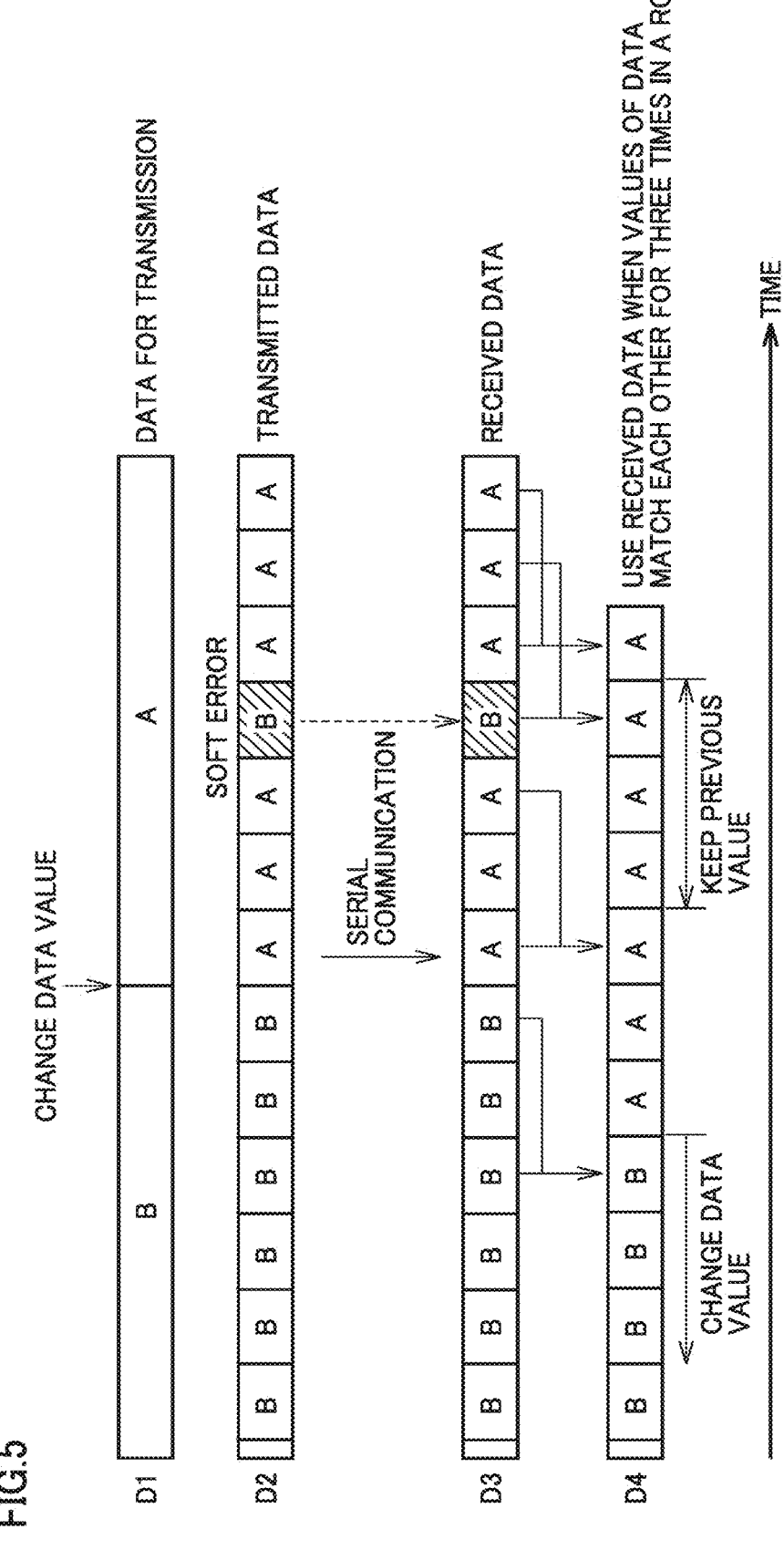
FIG. 5 is a diagram schematically illustrating an example of data illustrated in FIG. 4.

FIG. 5 is a diagram schematically illustrating an example of the data D1 to D4 illustrated in FIG. 4. In FIG. 5, the data for transmission D1, the transmitted data D2, the received data D3, and the data D4 to be transmitted to the CPU 51 are shown in order from the top.

As illustrated in FIG. 4, the data for transmission D1 generated by the CPU 41 of the main controller 40 on the transmission side is supplied to the CPU 51 in the controller 50 on the reception side as the data D4. In the following description, it is assumed that the value of the data for transmission D1 has an initial value of "A", and is changed from "A" to "B" during the operation of the uninterruptible power supply 100.

In the main controller 40, the data for transmission D1 is repeatedly written into the memory cell MC of the RAM 43 in accordance with the clock signal CLK. The written data for transmission D1 is read from the memory cell MC in accordance with the clock signal CLK, and is output from the I/F device 45 to the communication line 15 as the transmitted data D2. Through the write/read operation on the RAM 43, the transmitted data D2 is updated every clock cycle. Therefore, the transmitted data D2 in each clock cycle has the same value "A" as the data for transmission D1.

However, when a soft error occurs in the RAM 43 of the main controller 40 in a certain clock cycle, the transmitted data D2 in this clock cycle will have a value different from that of the data for transmission D1. In FIG. 5, it is assumed that the value of the transmitted data D2 is changed from "A" to "B" due to the soft error.

In a clock cycle next to this clock cycle, the data for transmission D1 is written into the memory cell MC of the RAM 43 again. Therefore, the value of the transmitted data D2 in the next clock cycle has the same value "A" as the data for transmission D1. By repeatedly performing the writing operation of the data for transmission D1 in this manner, it is possible to correct the error of the transmitted data D2 due to the soft error.

When the value of the data for transmission D1 is changed from "A" to "B", the value of the transmitted data D2 is also changed from "A" to "B" accordingly.

In the controller 50 on the reception side, the transmitted data D2 is written into the memory cell MC of the RAM 53 in accordance with the clock signal CLK. The written transmitted data D2 is read from the memory cell MC in accordance with the clock signal CLK, and is supplied to the determination circuit 68 as the received data D3. The received data D3 is substantially the same as the transmitted data D2. Therefore, the received data D3 contains the same data error as the received data D2.

Upon receiving the received data D3 from the readout circuit 64 every clock cycle, the determination circuit 68 compares the values of the data D3 in three consecutive clock cycles including the current clock cycle. In other words, the determination circuit 68 compares the value of the data D3 in the current clock cycle, the value of the data D3 in the previous clock cycle, and the value of the data D3 in a clock cycle before the previous clock cycle.

In FIG. 5, when all the three values have the value "A", the determination circuit 68 determines that the value "A" of the data D3 in the current clock cycle is correct. Therefore, the determination circuit 68 transmits the data D3 of the current clock cycle to the CPU 51 as the data D4 from the main controller 40.

On the other hand, when the three values do not match each other, the determination circuit 68 determines that an error may have occurred in any of the three values due to a soft error. When two data have the value "A" and the remaining one has the value "B" as illustrated in FIG. 5, the determination circuit 68 determines that the value "B" is likely to be a data error. Therefore, the determination circuit 68 does not transmit the data D3 of the current clock cycle to the CPU 51, but transmits the data D4 having the same value "A" as the data D4 transmitted in the previous clock cycle to the CPU 51.

The determination circuit 68 repeatedly performs the determination operation described above every clock cycle. Therefore, the temporary data error included in the received data D3 due to a soft error is masked by correct data located before and after this data, and as a result, is not reflected in the data D4. Therefore, it is possible to prevent the data D4 including an error from being transmitted to the CPU 51 and used for arithmetic computation. Thus, it is possible to prevent the uninterruptible power supply 100 from suffering from malfunction or temporary stop.

Although not shown in the drawing, even though a data error is not included in the transmitted data D2 but a soft error has occurred in the RAM 53 of the controller 50, a data error may be included in the received data D3. Even in such a case, the determination circuit 68 masks the temporary data error included in the received data D3 with the correct data located before and after this data, and thereby temporary data error is not reflected in the data D4.

As illustrated in FIG. 5, when the value of the data for transmission D1 is changed from "A" to "B", the value of the transmitted data D2 and the value of the received data D3 every clock cycle are also changed from "A" to "B". When the value of the data D3 in the current clock cycle, the value of the data D3 in the previous clock cycle, and the value of the data D3 in the previous clock cycle all become "B", the determination circuit 68 determines that the value of the transmitted data D2 itself has been changed. Therefore, the determination circuit 68 transmits the data D3 of the current clock cycle to the CPU 51 as the data D4.

In FIGS. 4 and 5, the process of transmitting data from the main controller 40 to the controller 50 has been described, but the same process may be performed when data is transmitted from the controller 50 to the main controller 40 or when data is transmitted from the controller 50 to another controller 50.

In other words, in the controller 50 on the transmission side, the data for transmission is repeatedly written into the memory cell MC of the RAM 53 in accordance with the clock signal CLK. In accordance with the clock signal CLK, the data for transmission is read from the RAM 53 and output to the communication line 15.

In the main controller 40 or the other controller 50 on the reception side, the data received via the communication line 15 is written into the memory cell MC of the RAM 43 or 53 in accordance with the clock signal CLK, read out from the RAM 43 or 53 in accordance with the clock signal CLK, and output to the determination circuit 68. The determination circuit 68 compares the values of the received data in a plurality of consecutive clock cycles including the current clock cycle. When all the values of the plurality of pieces of received data match each other, the determination circuit 68 transmits the value of the data in the current clock cycle to the CPU 41 or 51.

With the configuration mentioned, according to the present embodiment, it is possible to prevent incorrect data from being used due to a soft error that occurs in a RAM in any module without providing a majority decision determiner in a controller of each module. As a result, it is possible to prevent the uninterruptible power supply 100 from suffering from malfunction or temporary stop.

It should be understood that the embodiments disclosed herein are illustrative and non-restrictive in all respects. The scope of the present disclosure is defined not by the above description but by the claims, and is intended to include all modifications within the meaning and scope equivalent to the claims.

REFERENCE SIGNS LIST 1, 5, 10: capacitor, 2, 9: reactor, 3, 11: AC filter, 4: converter; 6: DC line; 7: bi-directional chopper, 8: inverter, 13: current detector, 15: communication line; 20: semiconductor switch; 24: operation unit; 30: commercial AC power supply; 31: load; 32: battery; 40: main controller; 41, 51: CPU; 42, 52: ROM; 43, 53: RAM; 44, 54: storage device; 45, 55: I/F device; 48,58: switch I/F; 50: controller; 56: detector; 57: gate driver; 60: memory cell array; 62: write circuit; 64: readout circuit; 66: decoder; 100: uninterruptible power supply; B0: bypass module; U1-Un, U: UPS module; S1-S3: switch.

The invention claimed is:

1. A power conversion device comprising:
a first module and a second module connected in parallel between an AC power supply and a load;
a first controller and a second controller provided corresponding to the first module and the second module, respectively;
a communication line that communicatively connects the first controller and the second controller,
wherein the first controller includes a first processor, and a first memory that temporarily stores a program to be executed by the first processor and data to be used by the first processor,
the second controller includes a second processor, and a second memory that temporarily stores a program to be executed by the second processor and data to be used by the second processor,
wherein data is related to operation parameters of the power conversion; and in transmitting data from the first controller to the second controller:
the first controller repeatedly performs a write operation of writing transmitted data into memory cells of the first memory in accordance with a clock signal, wherein each cell is storing a bit of the data and is updated at every clock cycle of the clock signal, reads the transmitted data from the first memory in accordance with the clock signal, and outputs the transmitted data to the communication line,
the second controller writes received data received from the communication line into memory cells of the second memory in accordance with the clock signal, and reads the received data from the second memory according to the clock signal,
when all data values of the received data read from the memory cells of the second memory in a predetermined plurality of consecutive clock cycles including a current clock cycle match each other, the second controller transmits the received data of the current clock cycle to the second processor.

2. The power conversion device according to claim 1, wherein
when all the data values in the predetermined plurality of clock cycles do not match each other, the second controller re-transmits the received data transmitted in the previous clock cycle to the second processor.

3. The power conversion device according to claim 2, wherein the first module and the second module are a first power conversion module and a second power conversion module,
each of the first power conversion module and the second power conversion module includes a power converter that receives an AC power from the AC power supply and generates an AC power to be supplied to the load, and
the first controller transmits data about an operation state of the power converter in the first power conversion module to the second controller.

4. The power conversion device according to claim 3, wherein
the data about an operation state of the power converter in the first power conversion module includes a detected value of an output current of the power converter and information about the presence or absence of a failure in the power converter.

5. The power conversion device according to claim 2, wherein
the first module is a bypass module,
the second module is one of a plurality of power conversion modules, and
the first controller transmits data about configuration of the power conversion device and data about control of the plurality of power conversion modules to the second controller.

6. The power conversion device according to claim 5, wherein
the power conversion device is configured to selectively operate in an inverter power supply mode in which AC power is supplied from the plurality of power conversion modules to the load and a bypass power supply mode in which AC power is supplied from the AC power supply to the load via the bypass module, and
the data about the configuration of the power conversion device includes information about an operation mode of the power conversion device.

7. The power conversion device according to claim 1, wherein
the first module and the second module are a first power conversion module and a second power conversion module,
each of the first power conversion module and the second power conversion module includes a power converter that receives an AC power from the AC power supply and generates an AC power to be supplied to the load, and
the first controller transmits data about an operation state of the power converter in the first power conversion module to the second controller.

8. The power conversion device according to claim 7, wherein
the data about an operation state of the power converter in the first power conversion module includes a detected value of an output current of the power converter and information about the presence or absence of a failure in the power converter.

9. The power conversion device according to claim 1, wherein
the first module is a bypass module,
the second module is one of a plurality of power conversion modules, and
the first controller transmits data about configuration of the power conversion device and data about control of the plurality of power conversion modules to the second controller.

10. The power conversion device according to claim 9, wherein the power conversion device is configured to selectively operate in an inverter power supply mode in which AC power is supplied from the plurality of power conversion modules to the load and a bypass power supply mode in which AC power is supplied from the AC power supply to the load via the bypass module, and the data about the configuration of the power conversion device includes information about an operation mode of the power conversion device.

* * * * *